United States Patent
Katayama et al.

(10) Patent No.: US 11,472,175 B2
(45) Date of Patent: Oct. 18, 2022

(54) FAILURE TIME ESTIMATION DEVICE, MACHINE LEARNING DEVICE, AND FAILURE TIME ESTIMATION METHOD

(71) Applicant: SEIKO EPSON CORPORATION, Tokyo (JP)

(72) Inventors: Shigenori Katayama, Okaya (JP); Kazunari Tsukada, Matsumoto (JP); Yuichi Shikagawa, Azumino (JP); Tetsuo Tatsuda, Ina (JP); Mamoru Ukita, Shiojiri (JP); Haruhisa Kurane, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 316 days.

(21) Appl. No.: 16/810,202

(22) Filed: Mar. 5, 2020

(65) Prior Publication Data
US 2020/0282719 A1 Sep. 10, 2020

(30) Foreign Application Priority Data

Mar. 8, 2019 (JP) .............................. JP2019-042320

(51) Int. Cl.
*B41J 2/045* (2006.01)
*B41J 2/165* (2006.01)
*G06N 20/00* (2019.01)

(52) U.S. Cl.
CPC ............ *B41J 2/0451* (2013.01); *B41J 2/165* (2013.01); *G06N 20/00* (2019.01)

(58) Field of Classification Search
CPC .... B41J 2/165; B41J 2/16517; B41J 2/16579; G06N 20/00; G06N 3/08; G06N 3/0454
See application file for complete search history.

(56) References Cited

U.S. PATENT DOCUMENTS

| 7,243,045 B2* | 7/2007 | Uwatoko | G03G 15/55 |
| | | | 399/9 |
| 2007/0047157 A1 | 3/2007 | Miyahara et al. | |
| 2013/0141484 A1 | 6/2013 | Kasai et al. | |
| 2016/0031250 A1 | 2/2016 | Yokozawa et al. | |
| 2016/0116377 A1* | 4/2016 | Uwatoko | G06K 9/6277 |
| | | | 702/181 |
| 2016/0243866 A1 | 8/2016 | Yokozawa et al. | |

(Continued)

FOREIGN PATENT DOCUMENTS

| CN | 103129148 | 6/2013 |
| JP | H06-320732 | 11/1994 |

(Continued)

OTHER PUBLICATIONS

Adrian Binging et al., Machine Learning Predictive Maintenance of Data in the Wild, 2019, IEEEXplore, pp. 507-512 (Year: 2019).*

*Primary Examiner* — Sharon Polk
(74) *Attorney, Agent, or Firm* — Workman Nydegger (57) ABSTRACT

A failure time estimation device includes: a memory configured to store a machine-learned model obtained by performing machine learning using teaching data associating printer information including at least one of operation history of a printer, state information indicating a current state, and a print result image indicating a print result with failure time of the printer; and a controller configured to obtain the printer information and estimate the failure time of the printer using the obtained printer information and the machine-learned model.

9 Claims, 6 Drawing Sheets

(56) References Cited

U.S. PATENT DOCUMENTS

2018/0373233 A1     12/2018  Goto
2020/0053234 A1 *    2/2020  Takahashi .......... H04N 1/00896

FOREIGN PATENT DOCUMENTS

| JP | H08-006444    |   | 1/1996  |         |
|----|---------------|---|---------|---------|
| JP | 2006-088391   |   | 4/2006  |         |
| JP | 2007-091467   |   | 4/2007  |         |
| JP | 2011206729 A  | * | 10/2011 |         |
| JP | 2015-170200   |   | 9/2015  |         |
| JP | 2015174256 A  | * | 10/2015 |         |
| JP | 2016-034718   |   | 3/2016  |         |
| JP | 6167948 B2    | * | 7/2017  | ................ B41J 2/01 |
| JP | 2019-008675   |   | 1/2019  |         |
| JP | 6592899 B2    | * | 10/2019 |         |

* cited by examiner

FAILURE TIME ESTIMATION DEVICE, MACHINE LEARNING DEVICE, AND FAILURE TIME ESTIMATION METHOD

The present application is based on, and claims priority from JP Application Serial Number 2019-042320, filed Mar. 8, 2019, the disclosure of which is hereby incorporated by reference herein in its entirety.

BACKGROUND

1. Technical Field

The present disclosure relates to a failure time estimation device, a machine learning device, and a failure time estimation method.

2. Related Art

To date, various methods have been proposed for predicting a failure of a device. For example, JP-A-2015-170200 discloses a method of reading by a scanner a test image printed by a printer, analyzing an analysis item of the obtained image, and determining whether or not a failure will occur on the printer at some point in the future based on a time series transition of the analysis result. Also, JP-A-2015-170200 discloses that the analysis item is, for example, a frequency analysis of an image.

However, there is a possibility that complex factors that are difficult to obtain by predetermined analysis item and determination criterion are correlated with failure time. When an analysis is carried out on a predetermined analysis item in accordance with a predetermined determination criterion as in the related art, there is a possibility that it becomes difficult to increase the prediction accuracy of failure time.

SUMMARY

An advantage of some aspects of the present disclosure is that it estimates failure time of a printer. According to an aspect of the present disclosure, there is provided a failure time estimation device including: a memory configured to store a machine-learned model obtained by performing machine learning using teaching data associating printer information including at least one of operation history of a printer, state information indicating a current state, and a print result image indicating a print result with failure time of the printer; and a controller configured to obtain the printer information and estimate the failure time of the printer using the obtained printer information and the machine-learned model.

With this configuration, it is possible to estimate failure time of a printer based on printer information including at least one of operation history of the printer, state information indicating the current state, a print result image. Also, with this configuration, failure time is estimated using a machine learning model, and thus it is not necessary for a person to determine a determination criterion for failure time estimation. Also, when a machine learning model is employed that estimates failure time based on a plurality of pieces of information including operation history, state information, a print result image, and the like, it is possible to increase the possibility of enabling estimation of failure time with high accuracy.

Further, in the above-described failure time estimation device, the print result image may be an image indicating a print result of a predetermined pattern image, the operation history may be history of operation traced back from printing of the pattern image, and the state information may be information indicating a state of the printer at printing time of the pattern image.

With this configuration, it is possible to obtain printer information when the printer prints a predetermined pattern image and to estimate failure time of the printer using the obtained printer information.

Further, in the above-described failure time estimation device, the pattern image may include at least one of a pattern formed by a line and a pattern including a specified-size area filled with a specified color.

With this configuration, it is possible to estimate failure time of the printer based on a print result image when the printer prints a line pattern or a pattern filled with a specific color.

Further, in the above-described failure time estimation device, the print result image may be captured by a sensor disposed on a carriage having thereon a print head including a nozzle discharging ink onto a print medium.

With this configuration, it is possible to obtain a print result image captured by a sensor disposed on the carriage on which a print head is mounted. For example, compared with the configuration in which a print result image is obtained by an image reading apparatus (scanner) separately from the printer, it is possible to reduce the workload of a user.

Further, in the above-described failure time estimation device, when a difference between a current time and the estimated failure time becomes less than a threshold value, the controller may give notification related to the failure time.

With this configuration, it is possible for a recipient (person or device) of the notification to prepare for failure. For example, it is possible to start procurement of a part estimated to have a failure, replacement of a part before failure, and the like. As a result, it is possible to shorten the down time of the printer. Also, a threshold value is set, and when the difference between the current time and failure time is equal to or more than the threshold value (when the period until the estimated failure time is equal to or more than a threshold value), a notification is not made, and thus it is possible to prevent an ill effect of making a notification on failure time uselessly from an early stage. For example, when a user is notified of failure time in an early stage, there is a possibility that the user does not prepare for the failure immediately, and the user might forget the failure time without making a preparation. Also, when notifications are made many times from an early stage, the user feels troublesome, and there is a possibility that notification becomes an empty formality in time.

Further, in the above-described failure time estimation device, the printer information may include execution history of maintenance including at least one of flushing for discharging ink from a print head to resolve a discharge failure of ink and wiping for wiping a nozzle face of a print head.

With this configuration, it is possible to estimate failure time of a printer based on the execution history of maintenance.

Further, in the above-described failure time estimation device, the printer information may include maintenance failure information indicated by a different between a number of maintenance executions and a number of resolving discharge failures after maintenance execution.

The maintenance failure information is information indicating a degree of the difficulty in resolving a nozzle discharge failure state even when maintenance, such as nozzle cleaning or the like is performed. There is a possibility that maintenance failure information and the failure of the printer are correlated with each other. With this configuration, it is possible to estimate the failure time of a printer using the maintenance failure information.

Further, in the above-described failure time estimation device, the printer information may include at least one of continuous operation time of the printer, temperature history of the printer, and ambient temperature history of the printer.

There is a possibility that the continuous operation time of a printer, the temperature history of the printer, the ambient temperature history of the printer, and the like are correlated with the failure of the printer. With this configuration, it is possible to estimate the failure time of a printer using these pieces of information.

According to another aspect of the present disclosure, there is provided a machine learning device including: a controller configured to obtain teaching data associating printer information including at least one of operation history of a printer, state information indicating a current state, and a print result image indicating a print result with failure time of the printer and to perform machine learning on a model receiving input of the printer information and outputting the failure time based on the teaching data.

With this configuration, it is possible to produce a machine learning model for estimating the failure time of a printer based on the printer information.

According to another aspect of the present disclosure, there is provided a failure time estimation method including: storing a machine-learned model obtained by performing machine learning using teaching data associating printer information including at least one of operation history of a printer, state information indicating a current state, and a print result image indicating a print result with failure time of the printer; and obtaining the printer information and determining the failure time of the printer using the obtained printer information and the machine-learned model.

With this method, it is possible to estimate the failure time of a printer based on the printer information. Also, with this method, failure time is estimated using a machine learning model, and thus it is not necessary for a person to determine a determination criterion for failure time estimation. Also, when a machine learning model is employed that estimates failure time based on a plurality of pieces of information including operation history, state information, a print result image, and the like, it is possible to increase the possibility of enabling estimation of failure time with high accuracy.

DESCRIPTION OF EXEMPLARY EMBODIMENTS

Here, a description will be given of embodiments of the present disclosure in the following order.

Figure 1:
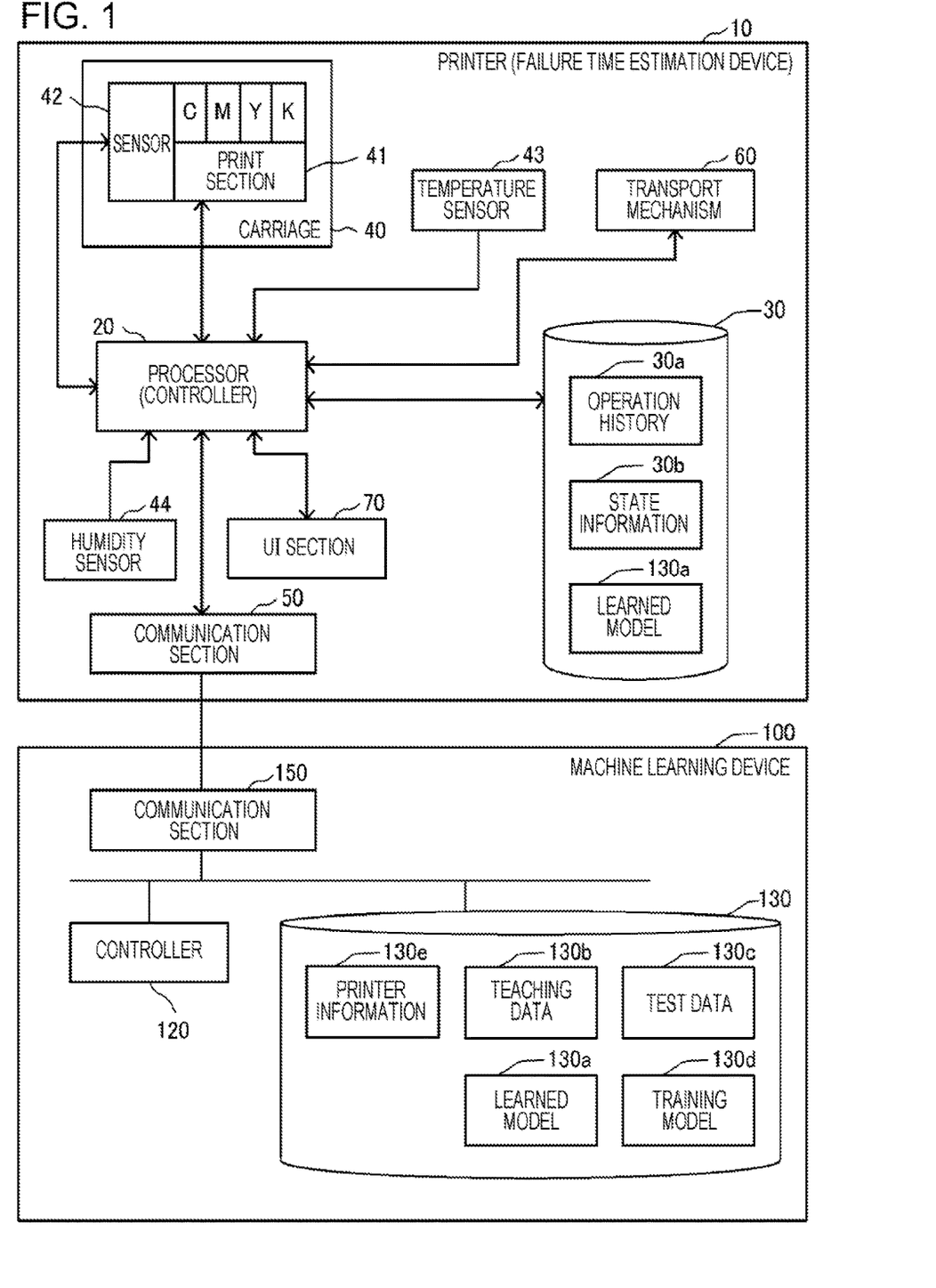
FIG. 1 is a block diagram of a printer and a machine learning device.

1. Configuration of Printer and Machine Learning Device
2. Pattern Image Print Processing
3. Other embodiments 1. Configuration of Printer and Machine Learning Device FIG. 1 is a block diagram illustrating the configuration of a printer 10 and a machine learning device 100 according to an embodiment of the present disclosure. In the present embodiment, the printer 10 also functions as a failure time estimation device. The printer 10 includes a processor 20 (corresponds to a controller of the failure time estimation device) including a CPU, a RAM, and the like, and a nonvolatile memory 30 (corresponds to a memory). It is possible for the printer 10 to execute various programs recorded in the nonvolatile memory 30 by the processor 20.

The printer 10 according to the present embodiment is an ink jet printer. The printer 10 includes a carriage 40, a temperature sensor 43, a humidity sensor 44, a communication section 50, a transport mechanism 60, a UI (user interface) section 70, and a clock section not illustrated in FIG. 1. It is possible for the processor 20 to obtain current time from the clock section.

The communication section 50 includes various removable memories mounted on the printer 10 and a communication interface circuit for communicating with the other devices connected to the printer 10 in a wired or wireless manner in accordance with various communication protocols. It is possible for the processor 20 to communicate with a machine learning device 100 described later and the other devices not illustrated in FIG. 1 via the communication section 50. Also, it is possible for the processor 20 to obtain data to be printed from a removable memory, the machine learning device 100, and the other devices that are connected via the communication section 50.

The transport mechanism 60 is a device that transports a print medium in a predetermined direction. It is possible for the processor 20 to control the transport mechanism 60 to transport the print medium by a predetermined procedure. A print section 41 and a sensor 42 are mounted on the carriage 40. It is possible for the processor 20 to perform reciprocal movement of the carriage 40 along a specific direction. In the printer 10, the carriage 40 is configured to be moved in the specific direction in a state in which the carriage 40 is held from a predetermined distance from the print medium. The specific direction in which the carriage 40 performs reciprocal movement is referred to as a main scanning direction hereinafter.

The UI section 70 includes a touch panel display, various keys and switches, and the like. It is possible for the processor 20 to obtain the operation contents of a user via the UI section 70. Also, it is possible for the processor 20 to display various kinds of information on the display of the UI section 70 and notify the user of the information.

The print section 41 includes print heads that discharge respective four kinds of ink, the CMYK (C: cyan, M: magenta, Y: yellow, K: black) colors, and ink tanks of the corresponding CMYK colors that are attached to the respective print heads. Of course, the ink colors and the number of colors are examples, and ink of the other colors and the other number of colors may be used. A print head includes a discharge nozzle. A plurality of discharge nozzles of the same color are arranged in the direction (referred to as a sub-scan direction) perpendicular to the main scanning direction to form a nozzle column. The nozzle columns of each color are arranged in the main scanning direction. It is possible for the processor 20 to control the ink discharge amount from each discharge nozzle, the discharge timing, and the like.

Accordingly, in the process of moving the carriage 40 in the main scanning direction, a discharge nozzle discharges each color ink so that it is possible to print an image onto the print medium. By repeating transport of the print medium (transport in the sub-scan direction) by the transport mechanism 60, movement of the carriage 40, and discharge of ink from the print head, it is possible to print an image onto any position in the printable range of the print medium.

The processor 20 updates the current state of the printer 10 at any time and stores the state in the nonvolatile memory 30 as state information 30*b*. Specifically, the processor 20 updates the accumulated number of shots, the accumulated number of passes, the accumulated discharge time, the number of maintenance executions, the number of resolving discharge failures after maintenance execution, and the like when the processor 20 carries out these operations.

The accumulated number of shots is the accumulated value of the number of times of discharging ink from a nozzle. The accumulated number of shots may be represented by each accumulated value counted for each nozzle, or the accumulated value of the highest number of nozzles out of nozzle columns (that is to say, for each ink color) or all the nozzles. The accumulated number of passes is the accumulated value of the number of times of movement of the carriage in the main scanning direction for discharging ink. For example, it may be assumed to be the accumulated value of times of movement of the carriage in a first direction of the main scanning direction for discharging ink and the accumulated value of the carriage in a second direction (the opposite direction to the first direction) for discharging ink.

The accumulated discharge time is the accumulated value of time periods during which the print head performs discharge operation of ink droplets from a nozzle attached to the printer 10. The accumulated discharge time may be defined, for example, to be the accumulated value of time of movement of the carriage for discharging ink droplets or the accumulated value of time of variation of the voltage applied to the piezoelectric element for discharging ink droplets from the nozzle from the reference potential. The accumulated discharge time may be represented by each accumulated value per nozzle or the accumulated value of the nozzle having the longest time out of a nozzle column or all the nozzles. In this regard, the ratio (operating rate of the print head) of the accumulated discharge time that occupies the elapsed time from the time when the print head is attached to the printer 10 and thereafter may be calculated and may be used as input data to a machine learning model described later.

The maintenance is operation carried out to resolve a discharge failure of a nozzle of the print head under the control of the processor 20. The maintenance includes, for example, micro vibration operation, wiping, flushing, suction operation, and the like. The micro vibration operation is operation to give such a pressure change that does not discharge an ink droplet so as to dissipate thickened ink in the vicinity of an opening of a nozzle. The wiping is wiping operation of a nozzle face (face in which an ink discharge opening is formed) of the print head by a wiper. The wiper is driven in response to the control of the processor 20. The flushing is operation to discharge ink droplets from a nozzle to prevent from thickening of ink and clogging due to thickened ink. The suction operation is operation to suck ink liquid from a nozzle and to discharge the ink.

The number of maintenance executions is the number of executions of the maintenance described above (accumulated value) from when the print head is attached to the printer 10. The number of maintenance executions may be represented by the number for each maintenance type, or may be represented by the total value of the number of executions of the individual types of maintenance. After maintenance execution, the processor 20 prints a pattern image in the present embodiment. The processor 20 then analyzes an image obtained by capturing the pattern image by a sensor 42 described later and determines whether or not a discharge failure has been resolved. The number of resolving discharge failures after maintenance execution is the number of resolving discharge failures after maintenance execution. For example, when a discharge failure is not resolved by performing flushing once, and is resolved by further performing flushing once again, the number of maintenance executions is two, and the number of resolving discharge failures after maintenance execution is one. The number of resolving discharge failures after maintenance execution may be represented by the number for each maintenance type, or may be represented by the total value thereof.

In this regard, the information (maintenance failure information) indicating the degree of difficulty in resolving a discharge failure state after the execution of maintenance may be calculated based on the number of maintenance executions and the number of resolving discharge failures after maintenance execution, and the information may be used as input data to a machine learning model described later. The maintenance failure information may be represented by the difference (C1−C2) between the number of maintenance executions (C1) and the number of resolving discharge failures (C2) after maintenance execution. Also, the maintenance failure information may be represented by the ratio which C2 occupies C1 (C2/C1). Also, the maintenance failure information may be calculated for each maintenance type, or may be calculated for all the maintenance types. At least any one of the other values calculated based on C1, C2, C1−C2, C2/C1, C1 and C2 may be used as input data to the machine learning model.

The sensor 42 is a sensor unit capable of obtaining image data indicating a print result printed by the print section 41. In the embodiment, the sensor 42 is included in the carriage 40 in the state of being adjacent to a discharge head in the print section 41 in the main scanning direction. Accordingly, it is possible for the processor 20 to move the sensor 42 in the main scanning direction by moving the carriage 40. With such a configuration, in the present embodiment, it is possible to bring the sensor 42 to any position on the print medium in the main scanning direction into view by moving the sensor 42 and capture the image of the print medium at the any position. In the present embodiment, the measurement result by the sensor 42 is used for determining whether or not in a discharge failure state and estimating failure time of the printer 10.

Figure 2:
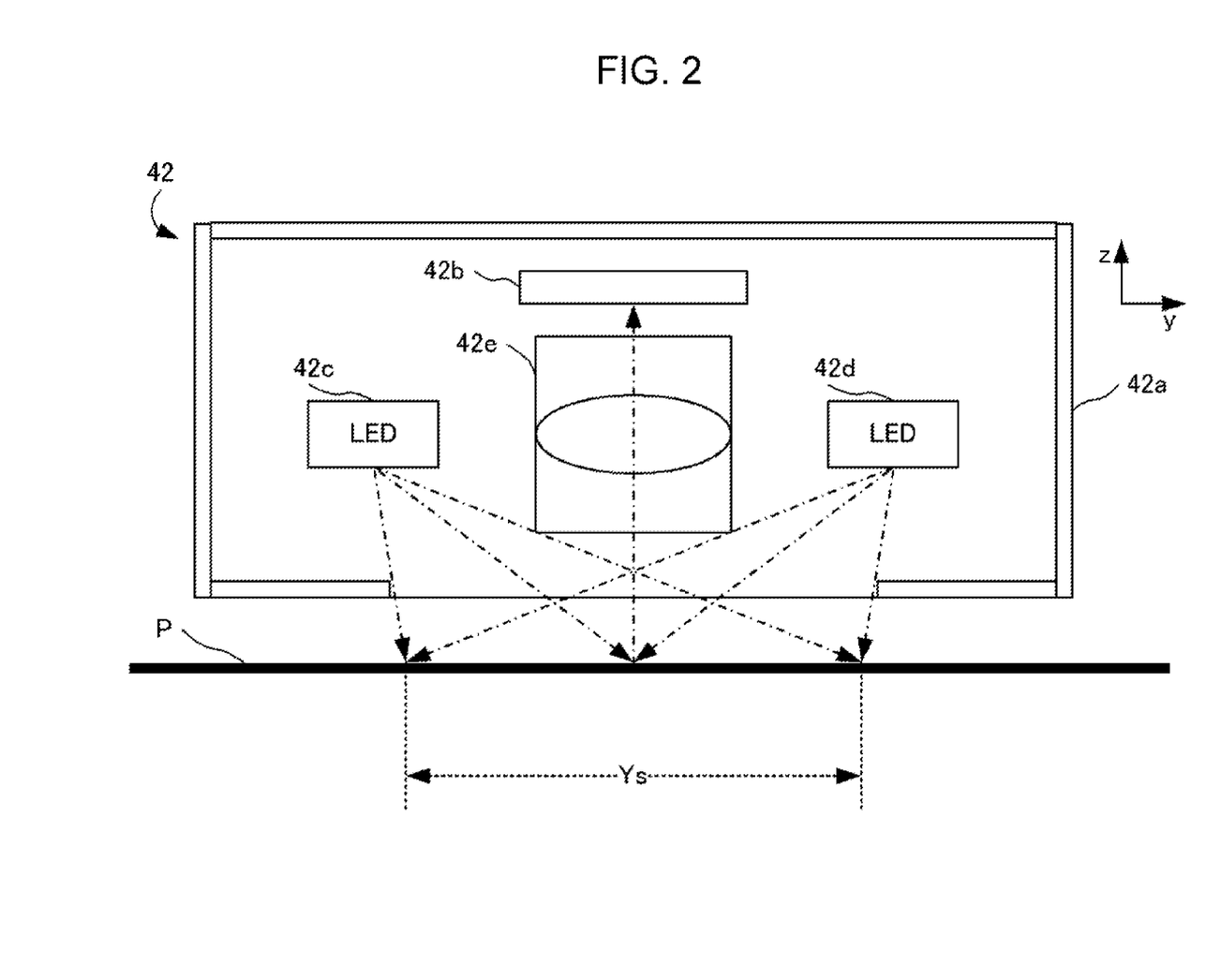
FIG. 2 is a schematic diagram illustrating the configuration of a sensor.

FIG. 2 is a diagram schematically illustrating the structure of the sensor 42. FIG. 2 schematically illustrates the sensor 42 and the print medium P, illustrates the sub scan direction as the y-direction, and illustrates the direction perpendicular to the printing surface as the z-direction. Accordingly, the main scanning direction is the depth direction which is perpendicular to the y-direction and the z-direction. In the present embodiment, the main scanning direction is also referred to as the x-direction.

The sensor 42 according to the present embodiment includes a casing 42*a* as illustrated in FIG. 2, and a space is formed inside the sensor 42 by the casing 42a. The casing 42a includes an area sensor 42b, LEDs 42c and 42d, and a lens 42e. The area sensor 42b includes sensor elements disposed in a two-dimensional manner. Each of the sensor elements is a sensor that reads the brightness of each color through a filter of a corresponding one of the RGB (R: red, G: green, B: blue) colors and outputs the brightness.

The LEDs 42c and 42d are light sources that emit light onto the print medium P. In the present embodiment, the sensor 42 includes the LEDs 42c and 42d that are disposed at two places respectively emit light onto the print medium P. A lens 42e is disposed at the negative direction in the z-axis direction viewed from the area sensor 42b, the light output from the LEDs 42c and 42d is reflected by the print medium P, and diffused light goes through the lens 42e and forms an image on the sensor elements of the area sensor 42b. Accordingly, it is possible for the area sensor 42b to read an image of the print medium P irradiated by the LEDs 42c and 42d. In FIG. 2, a part of the light path of the light emitted from the LED 42c and radiated in a reading range Ys of the print medium P and the light path of the light reflected from the print medium P to reach the area sensor 42b through the lens 42d are indicated by a dash-single dot arrow line. It is possible for the processor 20 to read an image of the surface of the print medium P based on the brightness of each RGB color read by each sensor element of the area sensor 42b.

The temperature sensor 43 is a sensor that detects the temperature of ink in a non-contact manner in the present embodiment. It is possible for the processor 20 to obtain the temperature of ink detected by the temperature sensor 43. The humidity sensor 44 is a sensor that detects the humidity of the space in which the printer 10 is mounted. It is possible for the processor 20 to obtain the humidity detected by the humidity sensor 44. In the present embodiment, the processor 20 obtains temperature and humidity from the temperature sensor 43 and the humidity sensor 44 respectively every certain period of time. At that time, the processor 20 associates temperature and humidity with date and time obtained from the clock section and stores the information in the nonvolatile memory 30 as operation history 30a.

The machine learning device 100 is a computer that stores teaching data based on the information obtained from the printer 10, performs machine learning based on the stored teaching data, and outputs the obtained machine-learned model 130a as a result to the printer 10. In this regard, the machine learning device 100 may generate teaching data, for example, by obtaining each printer specific printer information and failure date and time from a plurality of printers of the same type, and may distribute the machine-learned model 130a produced as a result of the machine learning using the teaching data to the plurality of printers of the same type.

The machine learning device 100 includes a controller 120 including a CPU, a RAM, a ROM, and the like, a recording medium 130, and a communication section 150. Of course, a GPU or various processors designed for machine learning may be used for the machine learning. It is possible for the controller 120 to perform the functions related to the machine learning by executing a machine learning program, not illustrated in the figure, recorded in the recording medium 130.

In the present embodiment, when the machine learning device 100 produces a machine learning model for estimating failure time of the printer 10, the printer 10 obtains printer information including the operation history 30a of the printer 10, the state information 30b indicating the current state of the printer 10, and the image indicating a print result output by the printer 10. In the present embodiment, it is assumed that, for example, when a print job is input to the printer 10, before executing printing by the print job, printing of a predetermined pattern image is performed.

When the processor 20 prints a pattern image, the processor 20 controls the sensor 42 to obtain an image of a print result indicating the pattern image. In this regard, the pattern image includes a pattern formed by lines (may include parallel lines and not parallel lines to the main scanning direction, and parallel lines and not parallel lines to the sub-scan direction), a pattern including a specific area filled with a specified color (for example, ink color), and the like.

Also, the processor 20 obtains the print date and time when the processor 20 printed the pattern image, associates the printer information, the print date and time, and the device ID of the printer 10, and transmits these pieces of information to the machine learning device 100. The printer information includes the operation history 30a traced back from the print date and time of the pattern image of the printer 10, the state information 30b indicating the state of the printer 10 at the print date and time, and the image indicating the print result of the pattern image. When the machine learning device 100 obtains the printer information, the print date and time, and the device ID, the machine learning device 100 associates the device ID and the print date and time, and stores the printer information 130e in the storage medium 130.

Figure 3:
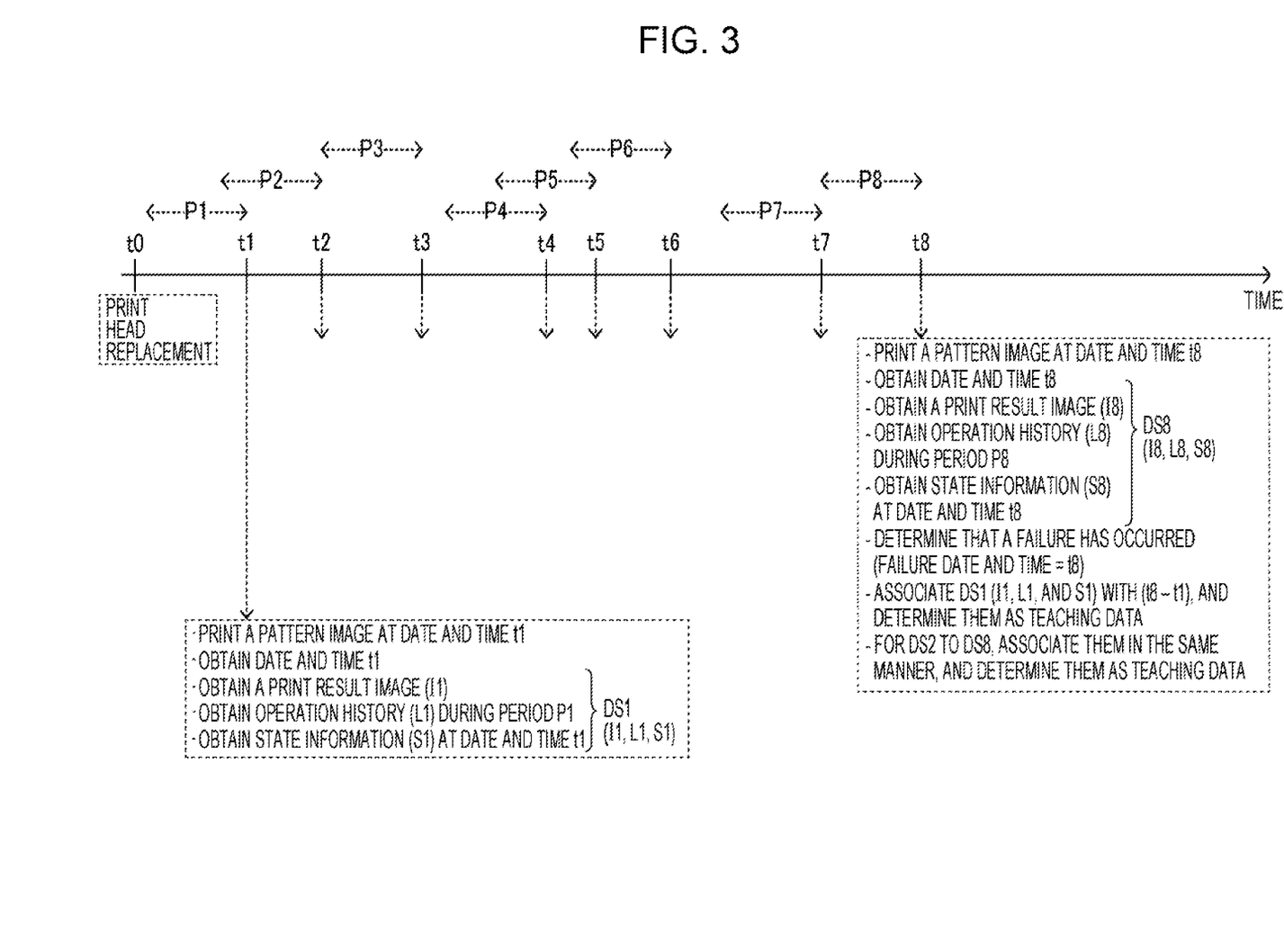
FIG. 3 is a diagram illustrating an example of obtaining printer information and failure time.

FIG. 3 is a diagram illustrating an example of the print timing of a pattern image by the printer 10 and the failure timing of the printer 10. In the example in FIG. 3, date and time t1 to t8 illustrate the print timing of the pattern image before print execution of a new print job. For example, when the pattern image is printed at date and time t1, the processor 20 obtains date and time t1 as print date and time from a clock section not illustrated in the figure, and obtains a print result image (I1) of the pattern image by the sensor 42. Also, the processor 20 refers to the operation history 30a and obtains operation history (L1) of a period P1 traced back from the date and time t1. In the present embodiment, the processor 20 obtains the temperature history and the humidity history in the period P1 traced back from the date and time t1 by referring to the operation history 30a. The period P2 to the period P8 have the same length as that of the period P1. For example, it may be assumed that the temperature history and the humidity history are obtained for each one hour in the past week (in that case, the length of the period P1 is one week (P2 to P8 have the same length), and the period of the history is one hour). In this regard, the length of the period may be changed in accordance with the type of the operation history, or the period of the history used may be different (for example, the temperature history may be for each one hour in the past one week, and the humidity history may be for each 12 hours in the past three days, and the like).

Also, the processor 20 obtains state information (Si), which is the information in the state of the printer 10 at date and time t1. Specifically, for example, the processor 20 updates the state information 30b in response to the printing the pattern image at date and time t1 and obtains the updated state information 30b. The processor 20 then associates printer information DS1 including the operation history (L1), the state information (Si), and the image (I1) with date and time t1 and the device ID of the printer 10, and transmits the information to the machine learning device 100. The machine learning device 100 associates the received printer information DS1 with the device ID and date and time t1, and stores the information in the storage medium 130. The printer 10 and the machine learning device 100 perform the same processing at date and time t2 to date and time t8, and the printer information DS2 to DS8 is stored in the storage medium 130 of the machine learning device 100. In FIG. 3, the description of the processing is omitted for the date and time t2 to t7, but the same processing as that of the date and time t1 is performed.

After the pattern image is printed, the processor 20 analyzes a print result image of the pattern image obtained by the sensor 42 and determines whether or not it is in a discharge failure state based on the difference with the expected pattern image. Specifically, for example, for a line pattern formed by a line for each ink color, in comparison with the original line pattern (a line pattern when printed in the normal state, not in the discharge failure state), when the occurrence of getting a bend, bold, faint/missing, drop off, color mixing, multiple lines, or the like is detected, the processor 20 determines that it is in a discharge failure state. Also, for example, for a pattern that is filled with a specific color, when the average density of an filled pattern area differs from the original average density (the average density represented as a print result in the normal state, not in the discharge failure state) by a predetermined value or more, the processor 20 determines that the current state is a discharge failure state.

When the processor 20 determines that the print head is in a discharge failure state, the processor 20 performs maintenance. The type of maintenance to be performed may be selected in accordance with the contents of the print result image of the pattern image. Also, for example, the type of maintenance to be performed may be selected in ascending order of ink consumption amount by the maintenance. When maintenance is performed, the processor 20 increments the number of maintenance executions. The processor 20 prints the pattern image again after maintenance execution and obtains a print result image by the sensor 42. The processor 20 then determines whether or not it is in a discharge failure state based on the print result image in the same manner as described above. When the processor 20 determines that it is not in a discharge failure state (in a normal state after a discharge failure is resolved), the processor 20 increments the number of resolving discharge failures after maintenance execution.

When the processor 20 prints the pattern image, and a predetermined failure determination criterion is satisfied, the processor 20 determines that the print head has failed. For example, the processor 20 may use as a failure determination criterion of a print head when a discharge failure state is not resolved after the processing of maintenance execution, pattern image print after the maintenance execution, and determination of a discharge failure based on the print result image of the pattern image is continuously repeated for a predetermined number of times. Also, for example, when a user inputs a statement that the user visually has determined the print result of the pattern image to be a failure via the UI section 70, it may be used as a failure determination criterion. When both the former and the latter are satisfied, it may be used as a failure determination criterion.

When a failure determination criterion is satisfied, the processor 20 obtains date and time when a failure has occurred from a clock section not illustrated in the figure, associates the date and time with the device ID of the printer 10, and transmits them to the machine learning device 100 via the communication section 50. When the controller 120 of the machine learning device 100 obtains a device ID and failure date and time from the printer 10 via the communication section 150, the controller 120 selects the printer information associated with the device ID in the storage medium 130 and calculates the difference between the print date and time associated with each of the selected printer information and the failure date and time. The difference indicates failure time of the print date and time associated with the printer information and thereafter. The controller 120 associates a combination of the image of the selected printer information, the operation history, and the state information with the calculated difference and stores them as one of teaching data 130b.

For example, the example in FIG. 3 indicates that the printer 10 has failed at date and time t8. In this case, the controller 120 of the machine learning device 100 selects, as teaching data, printer information having the associated device ID same as the device ID of the printer that has transmitted the failure date and time and not employed printer information DS1 to DS8, out of the printer information 130e stored in the storage medium 130. The controller 120 calculates the difference between the print date and time t1 of the printer information DS1 and the failure date and time t8, associates the printer information DS1 (the image I1, the operation history L1, and the state information Si) with the difference, and stores them in the storage medium 130 as one of the teaching data 130b. For DS2 to DS8, the controller 120 performs the processing in the same manner and stores them in the storage medium 130 as one of the teaching data 130b.

Figure 4:
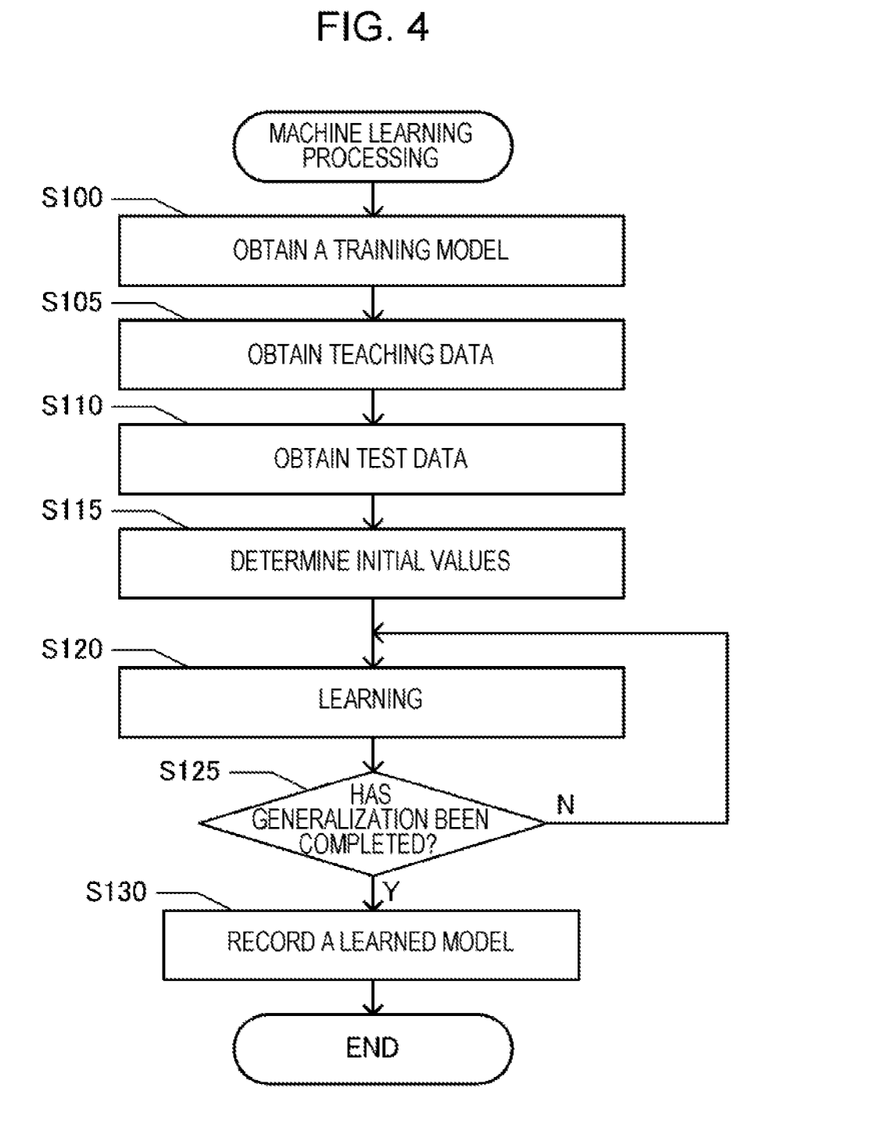
FIG. 4 is a flowchart of machine learning processing.

When a specified amount of teaching data is stored in this manner, the controller 120 performs machine learning processing using the teaching data. FIG. 4 is a flowchart illustrating the machine learning processing. The machine learning processing may be performed at any time after a specified amount of the teaching data 130b is stored. When the machine learning processing is started, the controller 120 obtains a training model 130d (step S100). Here, a model refers to information indicating an expression that derives the corresponding relationship between the data to be estimated and the data of an estimation result. In the present embodiment, as an example, a description will be given of a model in which data to be estimated is the printer information, and the failure time of the printer is the data of an estimation result. In this regard, in the present embodiment, failure time of a printer is represented by the difference between date and time of reference for obtaining printer information (in the case of the present embodiment, print date and time of the pattern image) and the failure date and time of the date and time and thereafter (or period including the failure date and time). Accordingly, for example, failure time is represented as one week later to less than two weeks.

Figure 5:
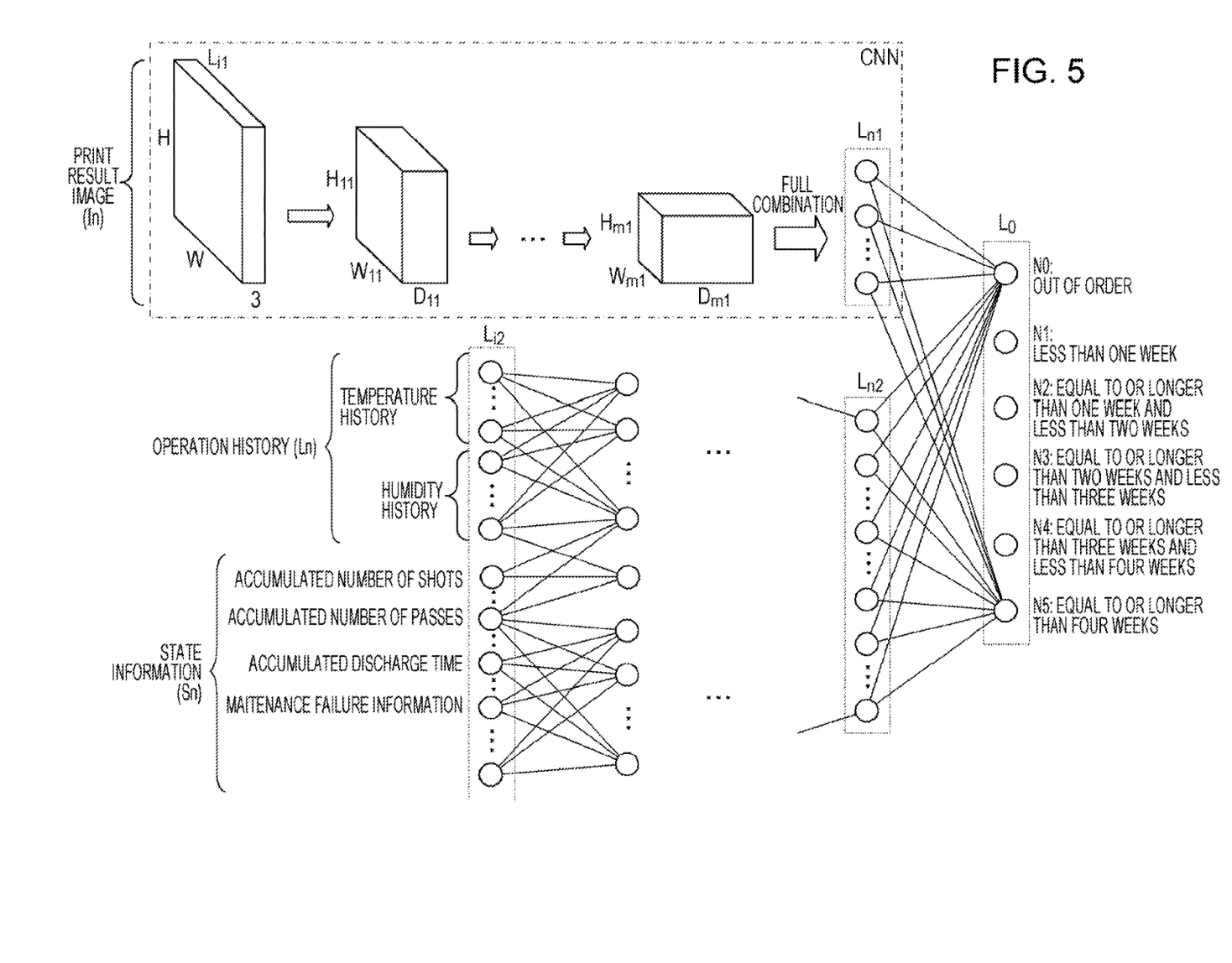
FIG. 5 is a diagram illustrating input and output of a machine learning model.

As long as a model converts input data into output data, it is possible to give various definitions to the model. FIG. 5 is a diagram schematically illustrating an example of a model used in the present embodiment. In the present embodiment, a CNN (convolutional neural network) is used for the image data (print result image (In)) obtained by capturing the image of the surface of the print medium on which the pattern image is printed. In FIG. 5, a change in the data format by CNN is denoted by a cuboid, and a node in a normal neural network is denoted by a white circle.

In the model according to the present embodiment, the image data indicating the print result image (In) is used as input data to the input layer $L_{i1}$ of CNN, and intermediate output data on the image data is output from the layer $L_{n1}$. The image data input to CNN has vertical H pixels and horizontal W pixels, and the grayscale values of three channels, R: red, G: green, and B: blue, are specified for each pixel. Accordingly, in FIG. 5, the image of an input layer $L_{i1}$ is schematically illustrated image by a cuboid having values of vertical H, horizontal W, and depth 3. FIG. 5 illustrates an example in which after the image is input to the input layer, the image goes through CNN, that is to say, the image is subjected to convolution operation by a predetermined number of filters having predetermined sizes, operations by an activation function, and operation by a pooling layer, and is converted into $H_{11} \times W_{11} \times D_{11}$ output values. In FIG. 5, an example is illustrated in which conversion is performed by going through a plurality of layers (omitted in FIG. 5) after this, and $H_{m1} \times W_{m1} \times D_{m1}$ output values are produced. After the $H_{m1} \times W_{m1} \times D_{m1}$ output values are obtained by CNN, output values indicating the intermediate output data on the image data are obtained in the layer $L_{n1}$ by full combination.

Also, the model according to the present embodiment is provided with a node for inputting operation history (Ln), and a node for inputting state information (Sn). In the present embodiment, each data forming the operation history (Ln) and each data forming the state information (Sn) are used as input data to each node of the input layer $L_{i2}$, and intermediate output data on the operation history and the state information are output from the layer $L_{n2}$.

For example, the model illustrated in FIG. 5 is provided with nodes for individually inputting temperature history and humidity history at regular time intervals in a period Pn traced back from date and time tn. Also, the model illustrated in FIG. 5 is provided with nodes for individually inputting each data (for example, accumulated number of shots, accumulated number of passes, accumulated discharge time, maintenance failure information, and the like) included in the state information (Sn) of the printer 10 at the date and time tn.

Each node of the output layer $L_o$ receives the output values of each node of layers $L_{n1}$ and $L_{n2}$ as input. Each node of the output layer $L_o$ corresponds to the estimated failure time (N0, N1, N2, N3, N4, and N5). Reference sign N0 is a node that corresponds to have the failure time of 0 (that is to say, is currently in failure). Reference signs N1 to N5 correspond to have failure time of less than one week, one week or later to less than two weeks, two weeks or later to less than three weeks, three weeks or later to less than four weeks, and four weeks or later in this order. The output values of the individual nodes N0 to N5 of the output layer $L_o$ are normalized to be totaled 1. In this regard, multiple layers may be provided between the layers $L_{n1}$ and $L_{n2}$, and the output layer $L_o$. It is possible to estimate the failure time corresponding to a node having the highest output value in the output layer $L_o$ to be the period having a high possibility that the printer 10 fails with the date and time associated with the printer information including each data input to the input layers $L_{i1}$ and $L_{i2}$ as a reference.

In step S100 in the flowchart illustrated in FIG. 4, a training model is obtained. Here, training refers to a learning target. That is to say, in a training model, printer information is input, and failure time of the printer 10 is output. However, a corresponding relationship between the printer information and the type of the failure time is not correct in the initial stage. That is to say, in the training model, it is possible to determine the number of layers included in a node and the number of nodes. However, the parameters (weight, bias, and the like) that specify the input and output relationship have not been optimized. These parameters are optimized in the process of machine learning (that is to say, are trained).

A training model may be determined in advance or may be obtained by operating a UI section (not illustrated in the figure) provided with the machine learning device 100 by an operator who operates the machine learning device 100. In either case, as illustrated in FIG. 5, the controller 120 obtains, as a training model, the parameters of the neural network that output the failure time of the printer 10 based on the printer information (In, Ln, and In) obtained by the printer 10.

Next, the controller 120 obtains teaching data (step S105). In the present embodiment, as described above, printer information, print date and time, and a device ID are transmitted from the printer 10 each time the printer 10 prints the pattern image, and are recorded in the storage medium 130 of the machine learning device 100. Also, when a failure occurs in the printer 10, teaching data is formed that associates the printer information of the printer indicated by the device ID with failure time of the printer based on the failure date and time and the device ID that are transmitted from the printer 10, the printer information, the print date and time, and the device ID that are stored in the storage medium 130, and the teaching data is stored in the storage medium 130. The controller 120 refers to the storage medium 130 and obtains the teaching data 130b. Next, the controller 120 obtains test data (step S110). In the present embodiment, part of the teaching data 130b is extracted from the teaching data 130b to be used as test data. The test data is not used for training.

Next, the controller 120 determines initial values (step S115). That is to say, the controller 120 gives initial values of the variable parameters to the training model obtained in step S100. The initial values may be determined by various methods. For example, random values, 0, or the like may be used as initial values, and the initial values may be determined based on a different idea of a weight and a bias. Of course, initial values may be adjusted such that the parameters are optimized in the learning process.

Next, the controller 120 performs learning (step S120). That is to say, the controller 120 inputs the printer information in the teaching data 130b obtained in the step S105 into the training model obtained by step S100 and calculates the output values of the output layer $L_o$. Also, the controller 120 identifies an error by a loss function that indicates an error between the type of the output print medium and the type of the print medium indicated by the teaching data 130b. The controller 120 then repeats update processing of the parameters based on the derivation of the loss function by the parameters a specified number of times. For example, consider the case in which teaching data is provided that associates the printer information (DS1) at date and time t1 with "after 180 days" as the failure time (t8-t1). The phrase "after 180 days" corresponds to "four weeks or later" of node N5 of the output layer $L_o$ in the model according to the present embodiment. Accordingly, in this case, the parameters are updated so that the output (N0, N1, N2, N3, N4, and N5) obtained by inputting printer information (DS1) into the model come close to (0, 0, 0, 0, 0, and 1).

Of course, it is possible to apply various functions to the loss function. For example, it is possible to apply a cross entropy error or the like. The processing for calculating the loss function as described above is performed on all of or a part of the image included in the teaching data 130b, and the loss function in one-time learning is expressed by its average or total. When the loss function in one-time learning is obtained, the controller 120 updates the parameters by a specified optimization algorithm, for example, stochastic gradient descent.

As described above, after the parameters are updated for a specified number of times, the controller 120 determines whether or not generalization of a training model has been completed (step S125). That is to say, the controller 120 obtains output indicating the setting by inputting the image data indicated by the test data obtained in step S110 into the training model. The controller 120 then obtains the matching degree of the output setting and the setting associated with the test data. In the present embodiment, when the matching degree is equal to or higher than a threshold value, the controller 120 determines that the generalization has been completed.

In this regard, in addition to the evaluation of generalization performance, the validity of hyperparameter may be verified. That is to say, in the configuration in which hyperparameters, which are the variable amounts other than weight and bias, for example, the number of nodes and the like are tuned, the controller 120 may verify the validity of the hyperparameter based on the verification data. The verification data may be extracted from the teaching data by the same processing as that in step S110. Of course, the verification data is not used for training in the same manner as the test data.

In step S125, when the controller 120 determines that the generalization of a training model has not been completed, the controller 120 repeats the processing of step S120. That is to say, the controller 120 further updates the weight and the bias. On the other hand, in step S125, when the controller 120 determines that the generalization of a training model has been completed, the controller 120 records a machine-learned model (step S130). That is to say, the controller 120 records a training model in the recording medium 130 as the machine-learned model 130a.

With the configuration described above, it is possible to produce a model (machine-learned model 130a) for estimating failure time of the printer 10. The controller 120 transmits the machine-learned model 130a to the printer 10 via the communication section 150. When the processor 20 of the printer 10 receives the machine-learned model 130a via the communication section 50, the processor 20 stores the machine-learned model 130a in the nonvolatile memory 30.

When the processor 20 of the printer 10 prints a pattern image after storing the machine-learned model 130a in the nonvolatile memory 30, the processor 20 obtains printer information (operation history, state information, and a print result image of the pattern image) and inputs the obtained printer information in the machine-learned model 130a. It is possible for the processor 20 to obtain the output value of each node of the output layer $L_o$ of the machine-learned model 130a and to estimate failure time based on the output value of each node. For example, when the output (N0, N1, N2, N3, N4, and N5) from the machine-learned model 130a are (0.001, 0.07, 0.9, 0.02, 0.006, and 0.003), the processor 20 selects N2 that has the highest output value. Reference sign N2 is associated with one week or later to less than two weeks. The processor 20 estimates that failure time is the period of one week or later to less than two weeks using the current time (the print date and time of the pattern image at this time) as a reference.

In the present embodiment, when the difference between the estimated failure time and the current time becomes less than a threshold value, the processor 20 notifies a user of the printer 10 of the estimated failure time via the display of the UI section 70. For example, the processor 20 may notify a user of the contents prompting the arrangement of replacement part of a print head, the contents prompting the arrangement of a serviceman who carries out maintenance work, the contents prompting the replacement of a print head, and the like.

For example, when a threshold value is 14 days, in a case in which the estimated failure time is less than two weeks, the processor 20 notifies a user. In this regard, for example, when the processor 20 notifies a user once, the processor 20 may not notify the user for a certain period. In this manner, it is possible not to notify the same contents frequently and to prevent from turning the notification into formality. Also, for example, the notification contents may differ, or the notification destination may differ depending on the case that the estimated failure time is less than two weeks, the case of less than one week, or the case that a failure has occurred at this point in time.

In this regard, the notification destination is not limited to the UI section 70, and may be to a PC not illustrated in the figure, a tablet terminal, or the like, which has transmitted a print job to the printer 10, or a server computer at a support center capable of communicating with the printer 10 via the Internet, or the like. When the notification is made to a support center, it is not necessary for a user of the printer 10 to actively perform replacement of a part, arrangement of a serviceman, and the like so that it is possible to reduce time and effort. For example, at the time of making a notification, the latest printer information may be transmitted to the support center. The type of a replacement part and the contents of maintenance work may be determined in accordance with the contents of the printer information.

As described above, with the present embodiment, it is possible to increase the possibility of shortening the down time of the printer 10. Also, it is possible to increase the possibility of shortening the operation time of a serviceman who carries out the maintenance work.

2. Pattern Image Print Processing

Figure 6:
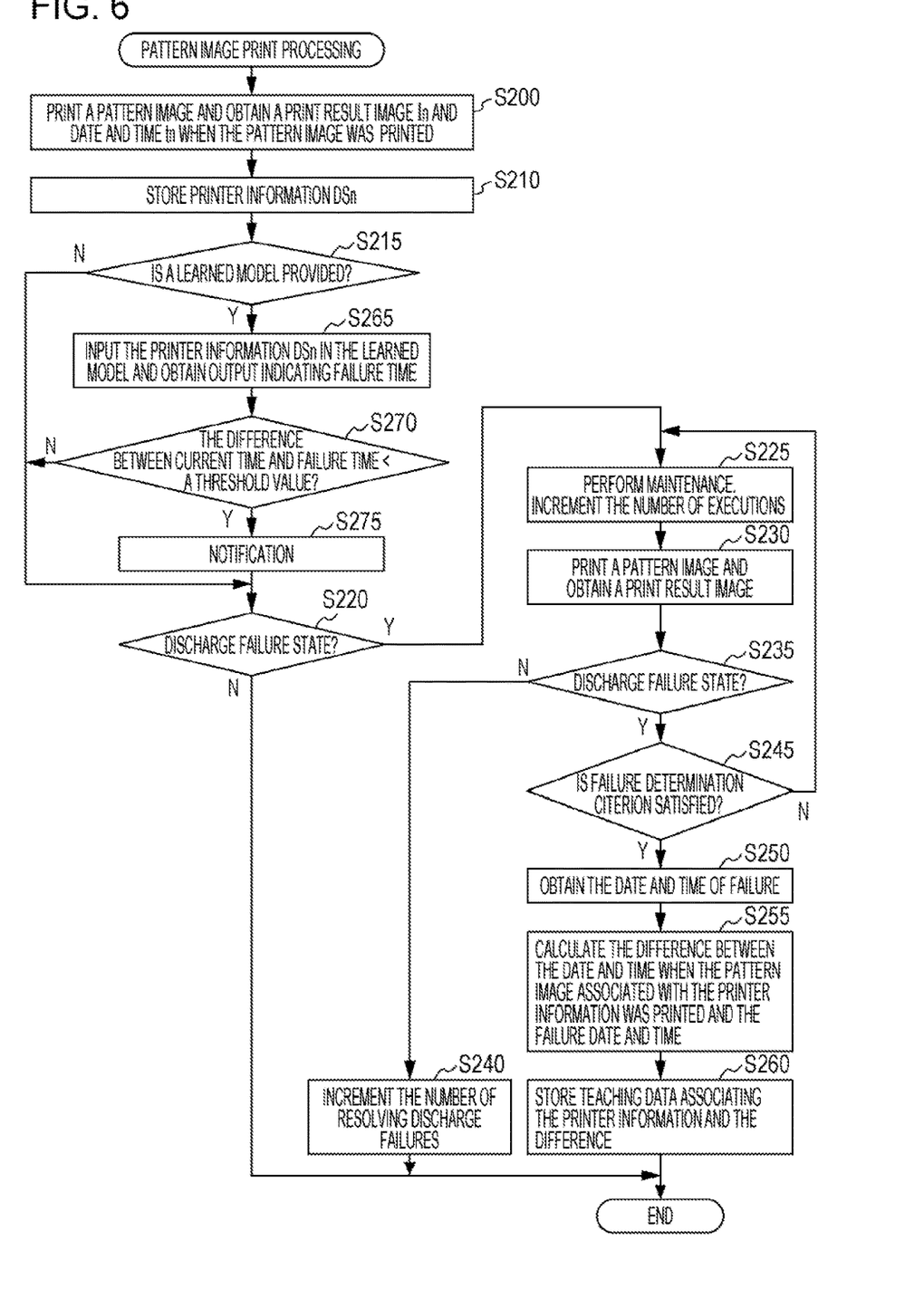
FIG. 6 is a flowchart of pattern image print processing.

FIG. 6 is a flowchart illustrating pattern image print processing performed by the processor 20 of the printer 10 and the controller 120 of the machine learning device 100. In the present embodiment, it is assumed that the pattern image print processing is performed when the printer 10 receives a print job. In this regard, the pattern image print processing may be performed at any time specified by a user of the printer 10 in addition to when a print job is received. The pattern image print processing may be performed at print operation start time of a day or at print operation end time.

The pattern image print processing illustrated in FIG. 6 includes printing of a pattern image and the processing involved with the printing of the pattern image. The processing involved with the printing of the pattern image includes obtaining printer information, discharge failure determination, maintenance, storing teaching data associating printer information and failure time, estimation of failure time using a machine-learned model, and the like.

When the pattern image print processing is started, the processor 20 of the printer 10 prints a pattern image and obtains a print result image (In) and pattern image print date and time tn (step S200). The processor 20 controls the transport mechanism 60 to transport a print medium and move the carriage 40 in the main scanning direction, and discharges ink droplets from the print head of the print section 41 to form the pattern image onto the print medium. The processor 20 moves the carriage 40 in the main scanning direction such that the pattern image printed on the print medium is included in the imaging range of the sensor 42 (sometimes causes the transport mechanism 60 to transport the print medium), and controls the sensor 42 to obtain the image (In) indicating a print result of the pattern image.

Also, the processor 20 obtains the print date and time tn of the pattern image from the clock section not illustrated in the figure. In this regard, by printing the pattern image, the state information, such as the accumulated number of shots, the accumulated number of passes, the accumulated discharge time, and the like are updated.

Next, the controller 120 of the machine learning device 100 stores the printer information (DSn) including the history (Ln) of the printer 10 until the print date and time tn, the state information (Sn) indicating the state of the printer 10 at the print date and time tn, and the print result image (In) (step S210). Specifically, the processor 20 of the printer 10 transmits the printer information (DSn) including the operation history (Ln), the state information (Sn), and the print result image (In), the print date and time tn, and the device ID of the printer 10 to the machine learning device 100. The controller 120 of the machine learning device 100 associates the printer information (DSn) with the print date and time tn and the device ID, and stores them in the storage medium 130.

Next, the processor 20 of the printer 10 determines whether or not a machine-learned model is provided (step S215). That is to say, the processor 20 obtains the machine-learned model 130*a* from the machine learning device 100 and determines whether or not it is stored in the nonvolatile memory 30. In step S215, when determined that a machine-learned model is not provided, the processor 20 determines whether or not it is in a discharge failure state (step S220). That is to say, the processor 20 analyzes the print result image (In) obtained in step S200 and determines whether or not the print head is in a discharge failure state based on an analysis result.

In step S220, when it is not determined to be in a discharge failure state (in a normal state), the pattern image print processing is terminated. In step S220, when it is determined to be in a discharge failure state, the processor 20 of the printer 10 performs maintenance and increments the number of executions (step S225). Specifically, for example, the processor 20 selects the maintenance in accordance with the analysis result of the print result image (In) and the maintenance in accordance with the execution order out of the plurality of types of maintenance described above, and performs the maintenance.

Next, the processor 20 prints a pattern image and obtains a print result image (step S230). The operation contents are the same as those of step S200. With the printing of the pattern image, the state information is updated in the same manner as the case of step S200.

Next, the processor 20 determines whether or not it is in a discharge failure state (step S235). That is to say, the processor 20 analyzes the print result image obtained in step S230 and determines whether or not it is in a discharge failure state based on an analysis result. The processing contents are the same as those in step S220.

In step S235, when it is not determined to be in a discharge failure state, the processor 20 increments the number of resolving discharge failures after maintenance execution (step S240) and terminates the pattern image print processing. In step S235, when it is determined to be in a discharge failure state, the processor 20 determines whether or not the failure determination criterion described above is satisfied (step S245).

In step S245, when it is not determined that the failure determination criterion is satisfied, the processing returns to step S225. In step S245, when it is determined that the failure determination criterion is satisfied, the processor 20 obtains failure date and time (step S250). In the present embodiment, it is assumed that the print date and time of the pattern image obtained in step S200 is used as failure date and time. In this regard, in step S245, the date and time obtained from the clock section when it is determined that the failure determination criterion is satisfied may be used as the failure date and time. The processor 20 transmits the failure date and time and the device ID to the machine learning device 100. In this regard, the determination that the failure determination criterion is satisfied in step S245 is made is in the pattern image print processing performed at the date and time t8 in the example in FIG. 3. In the pattern image print processing performed from the date and time t1 to the date and time t7, which is before the date and time t8, the processing proceeds to N determination in step S220 and the pattern image print processing is terminated, or the processing proceeds to N determination in step S245 and then the processing proceeds to N determination in step S235 (there is a possibility that the processing from S245: N determination to S235 is repeated to the extent that the failure determination criterion is not satisfied), the pattern image print processing after S240 is terminated. Accordingly, at the date and time t1 to t7, the printer information is stored in the storage medium 130 in step S210, but a failure has not occurred yet, and thus the print date and time, and the difference of the failure date and time and not associated.

Next, the controller 120 of the machine learning device 100 calculates the difference between the print date and time of the pattern image associated with the printer information stored in the storage medium 130 and the failure date and time obtained in step S250 (step S255). The printer information selected from the printer information 130*e* of the storage medium 130 for calculating the difference is the printer information associated with the same device ID as that of the printer which has transmitted the failure date and time. Also, the printer information selected for calculating the difference is the printer information which has not been employed as teaching data (for example, in the case of the example in FIG. 3, the printer information obtained after the date and time t0 when a print head is replaced most recently).

Next, the controller 120 of the machine learning device 100 stores the teaching data that associates the stored printer information with the difference calculated in step S255 in the storage medium 130 (step S260), and the pattern image print processing is terminated. For example, in the case of the example in FIG. 3, in the pattern image print processing performed at the date and time t8, teaching data is formed in which the printer information DS1 to DS7 that has been stored so far in the storage medium 130 and the printer information DS8 stored this time are associated with the respective difference between each print date and time (t1 to t8) and the failure date and time (t8). In this regard, when it is determined that the failure determination criterion is satisfied in step S245, a notification that prompts replacement of a print head may be displayed on the UI section 70 of the printer 10.

When the storage medium 130 of the machine learning device 100 stores a specific amount of teaching data 130*b* in the storage medium 130, the controller 120 performs the machine learning processing illustrated in FIG. 4 and produces machine-learned model 130*a*. The controller 120 then transmits the machine-learned model to the printer 10.

In step S215, when it is determined that a machine-learned model is provided, the processor 20 of the printer 10 inputs the machine-learned model in the printer information (DSn) and obtains output indicating failure time (step S265). That is to say, the processor 20 obtains failure time corresponding to a node that has output the highest value among (N0, N1, N2, N3, N4, and N5). Next, the processor 20 determines whether or not the difference between the current time and the failure time is less than a threshold value (step S270). For example, when the threshold value is 14 days, in a case in which the failure time estimated from the output of the machine-learned model 130*a* is less than two weeks (N0 or N1 or N2), it is determined that the different between the current time and the failure time is less than the threshold value.

In step S270, when it is not determined that the difference between the current time and the failure time is less than the threshold value, the processing of the processor 20 proceeds to the processing in step S220. In step S270, when it is determined that the difference between the current time and the failure time is less than the threshold value, the processor 20 notifies of the failure time via the display of the UI section 70 (step S275). For example, the processor 20 notifies a user to prepare for a failure because the failure is imminent. The notification destination may be a device that has transmitted a print job or may be a support center.

In this regard, when the processing proceed to Y determination in step S270, and it is estimated that the printer has already "failed" from the output of the machine-learned model 130*a*, the processing of step S220 to S260 may be omitted after a notification stating a failure and necessity of replacement is made in step S275.

After a machine-learned model 130*a* is generated once, new teaching data may be stored in S260. The newly stored teaching data may be used for relearning the machine-learned model 130*a*.

3. Other Embodiments

The embodiments described above are examples for carrying out the present disclosure. It is possible to employ various other embodiments as long as a machine-learned model is stored that is produced by machine learning using the teaching data associating the printer information including at least one of the operation history of the printer, the state information indicating the current state, and an image indicating a print result with failure time of the printer, printer information is obtained, and failure time of the printer is estimated by using the obtained printer information and the machine-learned model. For example, the controller of the printer may include the machine learning function that is realized by the controller of the machine learning device. Also, the functions performed by the memory and the controller of the failure time estimation device may be realized by the machine learning device or by a device other than the machine learning device and the printer.

In the above-described embodiment, a part whose failure time is estimated is assumed to be a print head. However, the failure time of a part other than a print head (for example, the transport mechanism of a print medium or the drive mechanism of a carriage) may be estimated.

The printer information (state information) may include accumulated powered-on time of a print head. The accumulated powered-on time may be the accumulated value of powered-on time from when a print head is attached to the printer and thereafter. The ratio of the accumulated powered-on time that occupies the elapsed time from when a print head is attached to the printer and thereafter may be calculated and used as input data to the machine learning model. In this regard, the powered-on time may be the powered-on time to a part other than a print head or the powered-on time of the entire printer.

The printer information (state information) may include the accumulated use amount for each type of the print medium. For example, the printer information may be assumed to be the accumulated value of use amount for each type of print medium used from when a print head is attached to a printer and thereafter (use amount of rolled paper of type-A print medium corresponding to N sheets of size-M cut paper, or the like). Also, the printer information (state information) may include the accumulated number of executions of borderless printing, the accumulated amount of executions (N sheets of size-M cut paper, or the like), and the like.

Also, the printer information may include information indicating the type of the print medium in addition to the print result image, and the type of the print medium may be included in one of the input data of the machine learning model. This is because when the print head is in a normal state, the print result image may differ depending on the type of the print medium. Also, an image analysis for determining whether or not a print head is in a discharge failure state may be performed in accordance with criterion depending on the type of the print medium. The type of the print medium may automatically be determined, for example, based on an image (image in a non-printing area of the print medium) obtained by the sensor 42, or a user may input the type of the print medium.

In this regard, in step S220 and step S235 of the pattern image print processing in FIG. 6, a machine learning model may be used for determining whether or not it is in a discharge failure state (whether or not discharge is normal). The model may be produced by machine learning using teaching data associating the print result image of the pattern image in the case of discharge normal with a label stating discharge normal (for example, 1: discharge normal, 0: discharge failure). The output value obtained by inputting a print result image of the pattern image into a machine-learned model may be compared with a threshold value (for example, 0.9). When the output value is equal to or higher than a threshold value, it may be determined to be in a discharge normal state, whereas when the output value is less than the threshold value, it may be determined to be in a discharge failure state.

Also, the printer information (state information) may include density. For example, a pattern singly filled with each ink color may be printed, and the density (for example, the average density of the filled area) of the filled pattern indicated by the print result image of the filled pattern may be obtained. The obtained density may be used as one of input data to a machine learning model for estimating failure time.

The printer information may include the continuous operation time of a printer. The continuous operation time may be defined, for example, as the mode, the average value, the longest value, or the like among the length of a period in which continuous printing has been performed in the most recent period of a predetermined length (for example, last three months). For example, it is assumed that a print job execution period is defined as a period from when the printer received a print job to when printing of the print job is completed. Also, when the length of a period between a print job execution period and the next print job execution period is within a threshold value (for example, one day), the print job is regarded as a continuous printing period. The length of a "period in which continuous printing is performed" defined in this manner is calculated for a most recent period having a predetermined length, and the statistical value as described above among the period may be regarded as continuous operation time. Also, the printer information may include, for example, history of the operating rate in 24-hour unit in the most recent period having a predetermined length.

Also, in the embodiments described above, a sensor that detects ink temperature is used. However, the temperature of a space where the printer is disposed or a region where the printer is disposed may be obtained. A thermometer that detects the temperature of a space or the temperature sensor may be disposed on the printer or may be separately disposed from the printer. In the latter case, the printer may obtain the temperature via communication from an external temperature sensor. For example, in the case of ink having a characteristic that ink temperature does not immediately follow when the room temperature of the room in which the printer is disposed varies, it is unlikely that ink thickness affects failure liability when the period of room temperature variation is short. Also, for example, when a period in which the room temperature becomes the degree of temperature to increase viscosity of ink is long, there is a possibility of affecting the failure liability. The characteristic of following the variation of the room temperature may differ depending on the type of ink. BY using temperature history as one of the input data to a machine learning model, it is possible to estimate failure time based on the temperature history. Also, a hygrometer may be disposed on the printer or may be separately disposed from the printer.

Also, the machine learning model described in the embodiments described above is only an example, and any configuration may be possible as long as it is possible to estimate failure time based on the printer information. For example, one output node may be disposed that receives input of the printer information and outputs whether or not a failure occurs within a period (for example, seven days or 14 days), which is a threshold value for determining whether or not to make a notification (1: will fail in less than a threshold value period and 0: will not fail in less than a threshold value period). When the value output to the output node equals to, for example, 0.9 or more, a notification on failure time may be made.

The print result image may be an image read by a scanner or an image captured by a camera separated from the printer under a specified imaging condition (illumination environment, and the like). In this regard, the print result image is not limited to an image indicating a print result obtained at the time of printing a predetermined pattern image, which is called a so-called nozzle check pattern, a test pattern, and the like. The print result image may be an image indicating a print result at the time of printing any image. Discharge failure determination based on the print result image of any image may be performed by comparison between the print target image data indicating any image (printing is performed based on the print target image data) and the image data (print result image data) of a print result image. Also, by inputting image data to be printed and print result image data into a machine learning model, it is possible to estimate failure time based on the difference of the both data.

The machine learning may be performed by various methods. That is to say, learning ought to be performed by building a model that receives input of the printer information and outputs failure time, and that minimizes the difference between the output by the model and the failure time of teaching data. Accordingly, for example, when machine learning by a neural network is performed, machine learning ought to be performed by suitably selecting various elements, such as the number of layers included in a model, the type of activation function, the type of loss function, the type of gradient descent method, the type of optimization algorithm of the gradient descent method, the existence of minibatch learning and the number of batches, learning rate, initial value, the existence and the type of overtraining method, the existence of convolutional layer, the filter size in the convolution operation, the type of filter, the type of padding and stride, the existence and the type of pooling layer, the existence of fully-combined layer, the existence of recursive structure, and the like. Of course, the other machine learning, for example, learning by a support vector machine, clustering, reinforcement learning, and the like may be performed. Further, machine learning that automatically optimize the structure of a model (for example, the number layers, the number of nodes for each layer, and the like) may be performed. Further, the learning may be performed dividedly in a plurality of stages.

The printer information may include execution history of maintenance including at least one of flushing which discharges ink from a print head in order to resolve an ink discharge failure and wiping which wipes the nozzle face of a print head. For example, execution history indicating the date and time when maintenance is performed and the type of the performed maintenance may be used as part of the input data to the machine learning model.

Further, it is possible to apply the method of estimating failure time of a printer as a program or a method. As described in the present disclosure, a machine-learned model is stored by performing machine learning using teaching data associating printer information including at least one of the operation history of the printer, the state information indicating the current state, and the image indicating a print result with failure time of the printer, the printer information is obtained, and the obtained printer information and the machine-learned model are used. Also, the above-described system, program, and method may be realized in various modes, for example, as a single device, or may be used as a part of a system including a plurality of devices. Also, it is possible to suitably realize a part of the system as software, a part of the system as hardware, and the like. Further, the present disclosure is realized as a recording medium storing a program that controls the system. Of course, the recording medium of the program may be a magnetic recording medium, a semiconductor memory, or may be considered to be any recording medium that will be produced by future development exactly in the same manner.

What is claimed is:

1. A failure time estimation device comprising:
a memory configured to store a machine-learned model obtained by performing machine learning using teaching data associating printer information with a failure time of a printer, the teaching data including at least one of an operation history of the printer, state information indicating a current state of the printer, and a print result image indicating a print result; and
a controller configured to obtain the printer information and estimate the failure time of the printer using the obtained printer information and the machine-learned model,
wherein the printer information includes maintenance failure information indicated by a difference between a number of maintenance executions and a number of resolving discharge failures after maintenance execution.

2. The failure time estimation device according to claim 1, wherein
the print result image is an image indicating a print result of a predetermined pattern image, the operation history is history of operation traced back from printing of the pattern image, and the state information is information indicating a state of the printer at printing time of the pattern image.

3. The failure time estimation device according to claim 2, wherein the pattern image includes at least one of a pattern formed by a line and a pattern including a specified-size area filled with a specified color.

4. The failure time estimation device according to claim 1, wherein the print result image is captured by a sensor disposed on a carriage having thereon a print head including a nozzle discharging ink onto a print medium.

5. The failure time estimation device according to claim 1, wherein when a difference between a current time and the estimated failure time becomes less than a threshold value, the controller gives notification related to the failure time.

6. The failure time estimation device according to claim 1, wherein the printer information includes execution history of maintenance including at least one of flushing for discharging ink from a print head to resolve a discharge failure of ink and wiping for wiping a nozzle face of a print head.

7. The failure time estimation device according to claim 1, wherein the printer information includes at least one of a continuous operation time of the printer, a temperature history of the printer, and an ambient temperature history of the printer.

8. A machine learning device comprising:

a controller configured to obtain teaching data associating printer information with failure time of a printer, and to perform machine learning on a model receiving input of the printer information and outputting the failure time based on the teaching data, the teaching data comprising at least one of operation history of the printer, state information indicating a current state of the printer, and a print result image indication a print result, wherein the printer information includes maintenance failure information indicated by a difference between a number of maintenance executions and a number of resolving discharge failures after maintenance execution.

9. A failure time estimation method comprising:

storing a machine-learned model obtained by performing machine learning using teaching data associating printer information with failure time of a printer, the teaching data including at least one of operation history of the printer, state information indicating a current state of the printer, and a print result image indicating a print result; and obtaining the printer information and determining the failure time of the printer using the obtained printer information and the machine-learned model, wherein the printer information includes maintenance failure information indicated by a difference between a number of maintenance executions and a number of resolving discharge failures after maintenance execution.

* * * * *